J. J. THOMAS.
APPARATUS FOR SEPARATING AMMONIACAL LIQUOR FROM GAS TAR.

No. 178,889. Patented June 20, 1876.

Witnesses.
D. L. Collier.
F. E. Harding.

Inventor.
John J. Thomas,
by J. Snowden Bell,
Attorney.

UNITED STATES PATENT OFFICE.

JOHN J. THOMAS, OF PHILADELPHIA, PENNSYLVANIA, ASSIGNOR OF ONE-HALF OF HIS RIGHT TO HENRY BOWER, OF SAME PLACE.

IMPROVEMENT IN APPARATUS FOR SEPARATING AMMONIACAL LIQUOR FROM GAS-TAR.

Specification forming part of Letters Patent No. 178,889, dated June 20, 1876; application filed March 15, 1876.

*To all whom it may concern:*

Be it known that I, JOHN J. THOMAS, of the city and county of Philadelphia, in the State of Pennsylvania, have invented certain new and useful Improvements in Apparatus for Separating Ammoniacal Liquor from Gas-Tar, of which the following is a specification:

The object of my invention is to provide means for effecting the rapid separation of mixed liquids of different specific gravities, specially the ammoniacal liquor and tar which are discharged in a commingled state from the hydraulic mains, condensers, and washers employed in the manufacture of illuminating-gas, in order to facilitate the collection of said products for utilization. To this end my improvements consist in the combination of an inlet and an outlet pipe, a tank or chest, a series of movable dividing-plates, and a bridge-plate and tar-dam, as hereinafter more fully set forth.

Figure 1:
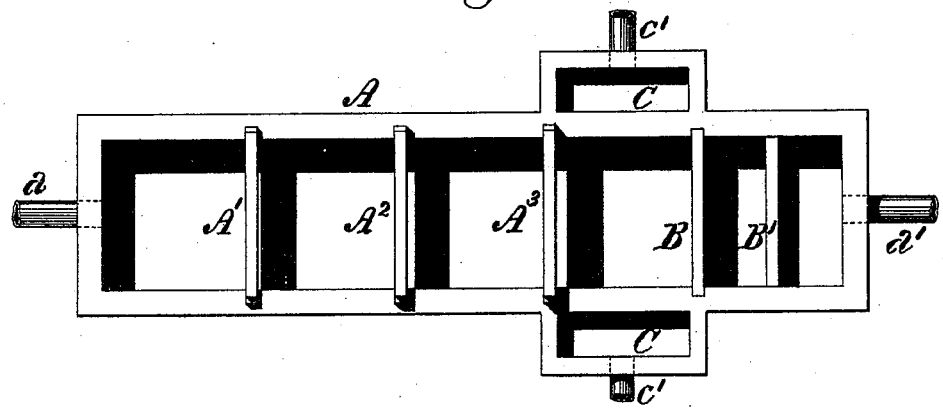
Figure 3:
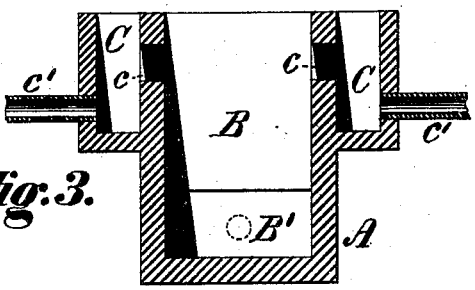
Figure 2:
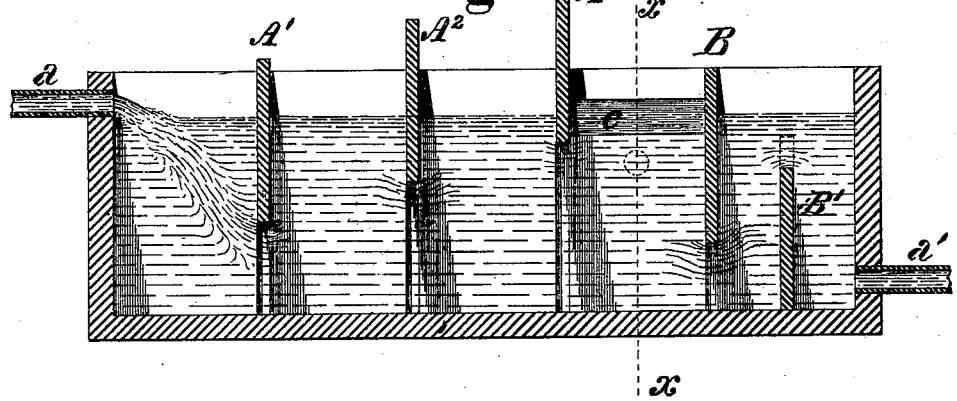

In the accompanying drawings, Figure 1 is a plan or top view of an apparatus embodying my improvements; Fig. 2, a vertical longitudinal section, and Fig. 3 a vertical transverse section at the line $x$ $x$ of the same.

In the operation of gas-works quantities of fluid are produced from the distillation of coal, the same consisting principally of tar and ammoniacal liquor. Each of these products is of value in the arts, the former being employed in the manufacture of aniline, roofing and paving compounds, &c., and the latter in the preparation of ammonia and its compounds. As such manufactures are usually conducted in establishments distant from the gas-works, it is desirable to remove the liquids therefrom as rapidly as produced, and at the same time to separate the tar and ammoniacal liquor one from the other, that each may be delivered to the special destination required for its further treatment. My improvements afford ready means for the accomplishment of these ends with economy and convenience.

To carry out my invention I provide an oblong tank or chest, A, having an inlet pipe or spout, $a$, connected to one of its ends near its top, through which pipe the liquor is supplied, and a tar-delivery pipe, $a'$, is connected to the opposite end near the bottom. A series of vertically-moving dividing-plates, varying in number according to the dimensions of the apparatus, are arranged transversely to the tank, and can be adjusted at any desired height therein upon guides or grooves in the sides. Between the tar-delivery pipe and the dividing-plate nearest thereto a bridge-plate, B, is placed transversely to the tank, extending across the same from the top or thereabout for the major portion of its depth, and a tar-dam, B', extends across the tank between the bridge-plate and delivery-pipe from the bottom of the tank to a point about the same distance above the lower side of the bridge-plate as the distance from the latter to the bottom of the tank. The bridge-plate can be adjusted vertically, so as to leave a greater or less space below it, according to the relative densities of the liquor which may be from time to time operated upon, and the height of the tar-dam may also be varied, as required, by placing an additional strip or strips upon its top. One or more longitudinal openings, $c$ $c$, in the upper portion of the sides of the tank between the bridge-plate and the dividing-plate nearest thereto, communicate with a delivery box or boxes, C, to which are connected the ammoniacal-liquor-delivery pipes $c'$.

In the operation of the apparatus the dividing-plates $A^1$ $A^2$ $A^3$ are adjusted at different heights in the tank, respectively increasing toward the delivery end thereof, by means of wedges, pins, or other suitable appliances. The liquid supplied through the pipe $a$ is compelled, in its traverse of the tank, to pass beneath the dividing-plates, which break its current and cause the subsidence of the heavier particles of tar, the lighter ammoniacal liquor being arrested by the bridge-plate B and led off through the upper openings $c$ to the delivery-pipe $c'$. Moreover, the spaces between the several dividing-plates constitute chambers, in which the upper strata of liquid, being comparatively quiescent, will be separated, in virtue of the different specific gravities of their components.

It is obvious that a greater or less number of dividing-plates may be employed, and, further, that the tank may be so constructed that the current of inflowing liquor will be caused to traverse its length and return in reverse direction, by means of a longitudinal partition and a connection at the end opposite the inlet-pipe, so as to be delivered adjacent to the latter.

I claim as my invention and desire to secure by Letters Patent—

The combination, in an apparatus for separating commingled liquids having different specific gravities, of a tank or chest, an inlet-pipe, a series of vertical dividing-plates, a lower transverse dam, and upper and lower delivery-pipes, substantially as set forth.

JOHN J. THOMAS.

Witnesses:
   J. SNOWDEN BELL,
   JOHN HOLLAND.